United States Patent Office 3,522,744
Patented Aug. 4, 1970

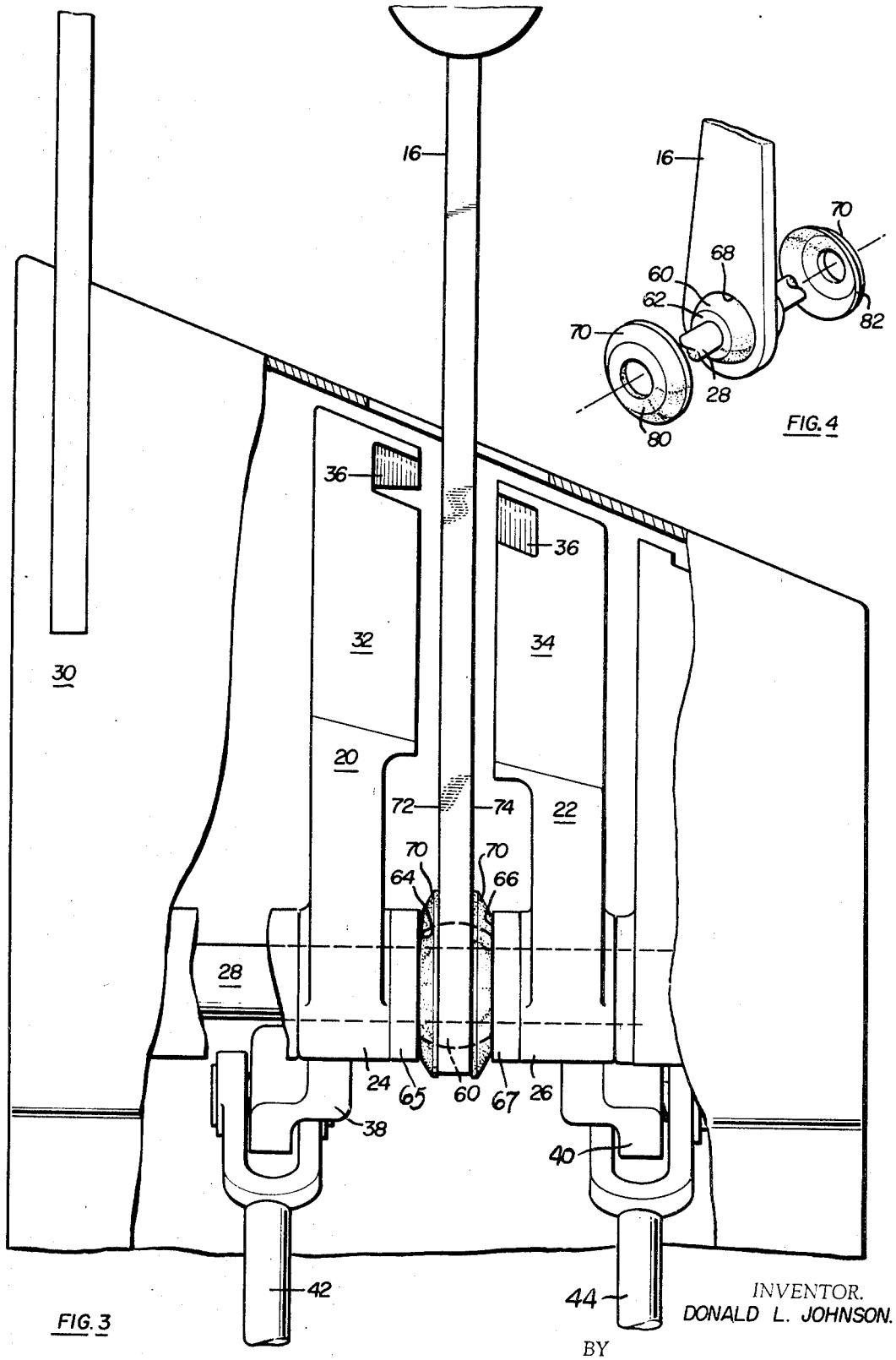

3,522,744
CONTROL LEVER MOUNTING
Donald L. Johnson, Kenosha, Wis., assignor to J. I. Case Company, Racine, Wis., a corporation of Wisconsin
Filed Oct. 3, 1968, Ser. No. 764,741
Int. Cl. G05g 9/00
U.S. Cl. 74—473
7 Claims

ABSTRACT OF THE DISCLOSURE

A mounting mechanism for a control lever universally supported on a shaft between axially spaced control elements which are selectively engageable by the lever to rotate the elements on the shaft. The mounting mechanism includes elastic disks or washers disposed on opposite sides of the control lever and respectively engaging one surface of the control lever and a surface of the control element so that pivotal movement axially of the shaft will compress one of the disks and the elasticity of the disks will return the lever to the centered position between the control elements when the lever is released.

BACKGROUND OF THE INVENTION

The present invention relates generally to shifter mechanisms and more particularly to an improved mounting means for a single control lever adapted to control the movement of a plurality of elements.

With the present day emphasis on automation of various operations generally performed with agricultural vehicles and implements, it has become necessary to provide an increased number of control units on the agricultural vehicle for respectively controlling the various operations.

Thus, for example, in an effort to increase the versatility of present day agricultural tractors, it has become customary to provide a transmission having as many as sixteen forward speeds and four reverse speeds so as to allow the operator of the tractor to select a proper ground speed for any of the many operations capable of being performed by a single tractor. While these types of transmissions and tractors have found considerable commercial success, the control units for such a type of transmission have become unduly complicated. Thus, for example, the subject matter disclosed in Pat. No. 2,936,649 is indicative of one extremely complicated type of control mechanism.

The competitive nature of the present day agricultural equipment manufacturers dictates that even a small savings in cost of manufacturing such implements and vehicles is highly desirable. Of course, the reduction in cost should not be made while sacrificing the desired results.

SUMMARY OF THE INVENTION

The present invention provides a simple and efficient control mechanism in which a plurality of control elements may be actuated by a single control lever with the control lever having a unique mounting which includes resilient disks engaging opposed surfaces of the lever. Thus, the lever is normally centered between the two elements and disengaged from either element so that the operator is insured that the control lever is in a neutral conditions upon being released.

Thus, the primary object of the present invention is to provide an improved shifting mechanism for a plurality of spaced selector units selectively engageable by a single control lever with an improved centering mechanism normally maintaining the control lever in an upright position with respect to the selector elements.

Another object is to provide an improved centering mechanism for a handle universally pivoted on a support shaft which normally maintains the control handle at a predetermined position with respect to the shaft.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is an enlarged end view of the control lever mounting mechanism of the present invention; and FIG. 4 is an enlarged perspective exploded view of the elements of the present invention.

DETAILED DESCRIPTION

Figures 1, 2:
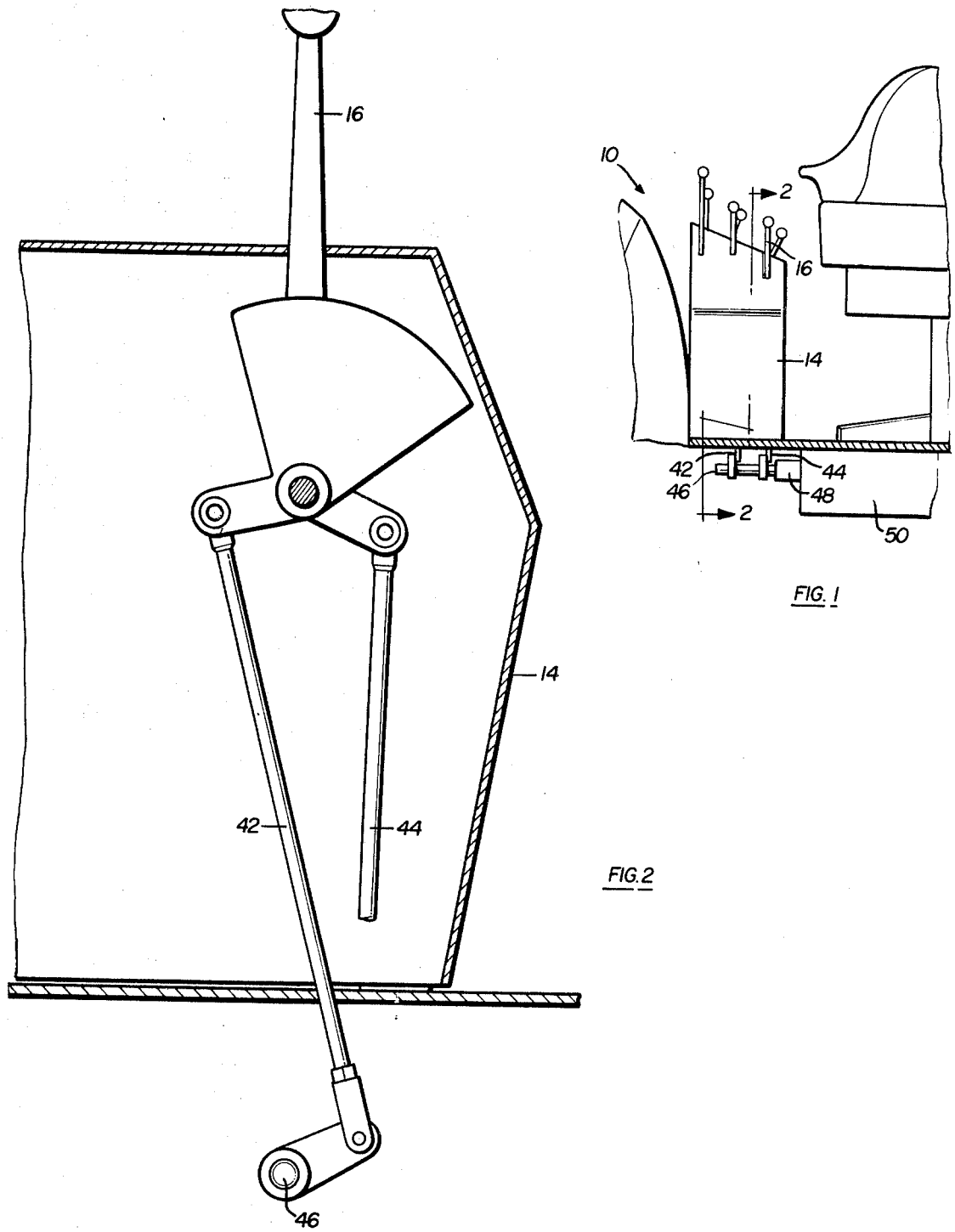
FIG. 1 discloses a fragmentary transverse sectional view of the operator's station of an agricultural vehicle having the control console disposed therein.
FIG. 2 is a fragmentary vertical sectional view taken generally along lines 2—2 of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIG. 1 of the drawings discloses the operator's station 10 of a conventional type of agricultural type of vehicle, such as a tractor, having an operator's seat 12 disposed therein. Adjacent one side of the operator's seat is a control console 14 housing a plurality of control units or elements selectively actuatable by control levers 16.

As was indicated hereinabove, the number of control elements presently required for agricultural vehicles of this type dictates that a plurality of elements are preferably controlled by a single control lever so as to reduce the congestion in the operator's station of the vehicle. Thus, it has become rather conventional to provide a single control lever selectively actuatable to control the movement of at least two elements.

As shown in FIGS. 2 and 3, the control lever 16 is selectively actuatable to control the movement of first and second control elements 20 and 22 respectively having hub portions 24 and 26 pivotally supported on a shaft 28 which has opposite ends supported by side walls of a housing 30. The control elements or selector units 20 and 22 respectively include quadrants, each having an inwardly directed flange 32 and 34 adjacent the upper free end thereof each of which includes means defining a recess 36 adapted to receive the control lever 16 therein. Also, each of the control elements or quadrants 20 and 22 respectively have arms 38 and 40 fixedly secured at a point spaced from the axis of the shaft 28. The respective arms 38 and 40 are adapted to be connected to a controlled device through links 42 and 44.

In the illustrated embodiment, the respective links 42 and 44 are connected to concentric rotatable elements 46 and 48, which illustratively are shown as being a pair of control devices forming part of a conventional transmission 50 for the agricultural vehicle. While not limited to any particular type of transmission, the transmission shifting mechanism for selecting a plurality of desired speed ratios between the input and output shafts of the transmission may be of the type disclosed in application Ser. No. 702,401, filed Feb. 1, 1968, now Pat. No. 3,479,900 and assigned to the assignee of the present application. Of course, it is readily apparent that the present invention is not limited to controlling a transmission and may be utilized for the control of any two elements by a single control lever. By way of example, and not of limitation, the respective quadrants 20 and 22 could equally be connected to respective valves selectively supplying fluid to opposite ends of fluid rams which conventionally form a part of the ancillary equipment forming part of the agricultural tractor.

According to the present invention, means are provided for normally centering the lever or handle 16 between and disengage from the respective control elements or units 20 and 22.

As clearly shown in FIGS. 3 and 4, the above-mentioned means includes a spherical member 60 fixedly secured to the shaft and having a diameter greater than the diameter of the shaft. An inspection of FIG. 3 shows that the axial length of the spherical member 60 is slightly less than the diameter of the shaft 28 to define spaced parallel abutments 62 which are engaged by adjacent surfaces or abutments 64 and 66 defined on spacers 65 and 67 adjacent the hubs of the control elements 20 and 22. The lower end of the control lever or handle 16 has an opening 68 substantially equal to the diameter of the spherical member or means 60 defined on the shaft 28. Thus, it is readily apparent that the handle 16 is mounted for universal pivotal movement with respect to the shaft 28.

According to the principle feature of the present invention, the centering means further includes a pair of disks or washers 70 supported on the shaft between the abutment 64 and 66 and the opposed surfaces 72 and 74 of the control lever or handle 16.

The respective disks or washers 70 are made of an elastic material which spontaneously returns to its original size, shape or configuration after being altered from such size, shape or configuration. Further, the respective disks 70 are of a configuration substantially in the form of a spherical segment having opposed parallel surfaces 80 and 82 extending substantially perpendicular to the axis of the shaft 28. The respective surfaces 80 of the two disks are in frictional engagement with one of the abutments or surfaces 64 and 66 defined on the respective selector elements 20 and 22 while the surfaces 82 of the disks respectively engage the opposite surfaces 72 and 74 of the control lever or handle 16.

Thus, in the assembled condition shown in FIG. 3, the inherent elasticity of the respective disks 70 will maintain the lever 16 between the two control elements 20 and 22 and out of engagement with each of the elements. Of course, the operation of the device is readily apparent. The operator need only move the handle along an axis defined by the shaft 28 to thereby pivot the lever on the spherical member 60 to engage one of the recesses or openings 36. Thereafter, rotational movement of the control lever transversely of the axis of the shaft 28 will of course move the quadrant or control element 20 or 22 to thereby produce the desired actuation of a controlled element such as the element 46 or 48 of the transmission 50.

When ever the control lever 16 is released after the desired movement of the quadrant 20 and 22, the elastic nature of the disk 70, which may be formed of rubber or an equivalent material, will be sufficient to automatically return the control lever to its centered or neutral position between the two quadrants 20 and 22.

From the above description it is readily apparent that the present invention provides a simple and efficient manner of automatically centering the control lever which is capable of controlling at least two control elements. Even a cursory inspection of the respective figures of the drawings shows that the centering mechanism is very simple and foolproof in installation as well as operation.

The advantages of such a simple and efficient centering mechanism over that of the complicated spring type devices of the type disclosed in Pats. Nos. 2,539,217 and 3,184,989 is readily apparent. Of course, the cost of manufacturing the present centering mechanism is considerably less than the cost of manufacturing any present day commercial centering mechanism and the ease of installation further decreases the cost of the centering mechanism.

While the control lever has been shown to be associated with only two control elements, it is readily apparent that three or four control elements could equally be controlled by a single control lever. For example, the spacers 65 and 67 could be removed and one or even two additional control elements could be inserted on the shaft to replace the spacers. Of course, these additional control elements would have to include transversely extending slots to allow the control lever to be moved across these slots and into slots 36.

I claim:

1. A centering mechanism for a handle universally pivotally supported on a shaft between axially spaced first and second control elements selectively engageable by said handle, comprising a spherical member supported on said shaft intermediate said control elements with said handle mounted on said member for pivotal movement axially of said shaft, and disks engaging opposed surfaces of said handle whereby pivotal movement of said handle axially of said shaft to engage one of said elements will compress said disks and said disks will center said lever between said control elements when said handle is released.

2. A centering mechanism as defined in claim 1, including the further improvement of said control elements including hub portions limited to rotational movement on said shaft, said hub portions having adjacent surfaces on opposite ends of said spherical member with said disks each engaging one of said hub portion surfaces.

3. A shifting mechanism as defined in claim 1 including the further improvement of said spherical member having a diameter greater than the diameter of said shaft and a length axially of said shaft less than the diameter of said shaft to define axially spaced parallel abutments, said selector units each having a hub portion rotatable on said shaft and having a diameter greater than the diameter of said spherical member to define abutments adjacent opposite ends of said spherical members, said disks each defining a spherical segment having opposed parallel ends respectively engaging one of said surfaces on said shaft and one of said hub portion abutments.

4. In a shifting mechanism including a shaft rotatably supporting a plurality of axially spaced selector units with a control lever mounted on said shaft between said units and adapted for selective engagement with said units to rotate said units on said shaft and means for normally centering said lever between said units, the improvement of said last means comprising a pair of elastic disks concentric with said shaft and each engaging a surface of said lever and an adjacent surface of one of said units whereby pivotal movement of said lever axially of said shaft to engage one of said units will compress one of said disks and the elasticity of said disks will return said lever to the central position when said lever is released.

5. A shifting mechanism as defined in claim 4 wherein said shaft includes a spherical member between said units with said lever having an opening adjacent one end thereof receiving said spherical member, the further improvement of said disks comprising washers surrounding said shaft and engaging said surfaces of said lever adjacent said opening.

6. A shifting mechanism as defined in claim 5, including the further improvement of each of said washers comprising a spherical segment having opposed parallel surfaces on opposite ends respectively engaging a surface of said lever and a surface of one of said selector units.

7. A shifting mechanism including a control lever and a pair of control quadrants each having one end rotatably supported on a shaft and having a recess spaced from said shaft for selective engagement by said control lever and mounting means for said lever and disposed on said shaft between said quadrants, the improvement of said mounting means comprising: means defining a spherical surface on said shaft between said quadrants with said lever having an opening substantially equal to the diameter of said spherical surface, and a pair of elastic washers concentric with said shaft and each having spaced parallel surfaces extending transversely of said shaft and respectively engaging a surface of said lever and a surface on one of said quadrants to maintain said lever spaced from said recesses whereby pivotal movement of said lever axially of said shaft will compress said elastic washers and said washers will return to the original condition upon release of said lever to return said lever to a position spaced from said quadrant recesses.

References Cited

UNITED STATES PATENTS 2,265,260  12/1941  Argo.

MILTON KAUFMAN, Primary Examiner

U.S. Cl. X.R.

74—471; 267—88